United States Patent [19]

Ferris

[11] Patent Number: 4,599,903
[45] Date of Patent: Jul. 15, 1986

[54] AIR CONDITIONER REFRIGERANT CHECK GUIDE

[76] Inventor: James E. Ferris, Richardson, Tex.

[21] Appl. No.: 740,478

[22] Filed: Jun. 3, 1985

[51] Int. Cl.⁴ .................. G01L 17/00; G01L 19/00
[52] U.S. Cl. ................................. 73/756; 73/146.8
[58] Field of Search ........................... 73/756, 146.8

[56] References Cited

U.S. PATENT DOCUMENTS

| | | | |
|---|---|---|---|
| 988,917 | 4/1911 | Walker | 73/756 |
| 2,160,414 | 5/1939 | Eksergian et al. | 73/756 |

FOREIGN PATENT DOCUMENTS 0372944  3/1907  France ................................. 73/756

Primary Examiner—Donald O. Woodiel
Attorney, Agent, or Firm—Warren H. Kintzinger

[57] ABSTRACT

A universal refrigerant system check gauge adapter in the form of an instrument of semi rigid yet flexible plastic having a bottom tube that is received in a valve head opening of a pressure gauge and about a valve pin within the valve head opening. The top end of the adapter has an opening shaped to fit on and over the low pressure suction side valve fitting of a refrigeration system. Internal projections within the bottom extended tube engage the end of the check gauge valve pin and a center projection within the adapter top end opening engages the valve stem of the refrigeration system suction side valve fitting so that as the check gauge is pushed toward the refrigeration valve fitting the refrigeration system valve is opened and refrigeration gases propelled from the refrigeration system enter the check gauge passing through the center opening of a resiliently compressible washer and through a port opening in the valve head. The end of the bottom tube compresses the resiliently compressible washer as the valve pin is brought into engagement with the ends of the internal projections thereby sealing the adapter to the check gauge and the adapter top end opening so fits the refrigeration system valve fitting that refrigerant materials leak very little if at all. The rectangular gauge indicator stem has at least one side that indicating pressure zones add: low, safe, high, and danger that are color coded as well. Other sides of the indicator stem are pressure numbered for use of the check gauge as a tire gauge without the adapter in place.

13 Claims, 5 Drawing Figures

U.S. Patent   Jul. 15, 1986   4,599,903
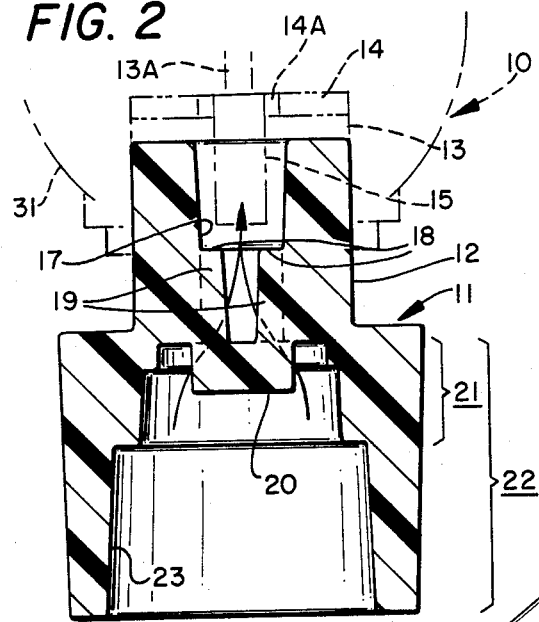
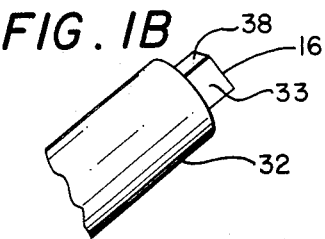
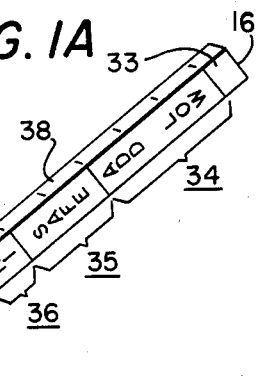
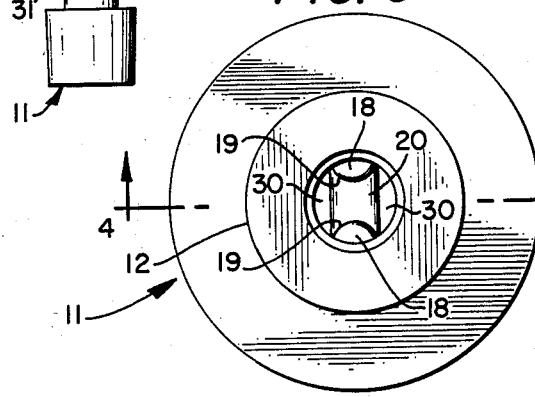
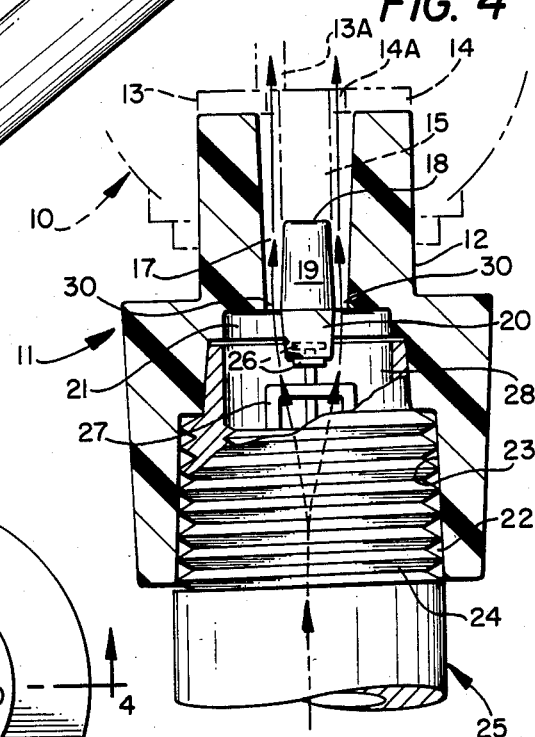

AIR CONDITIONER REFRIGERANT CHECK GUIDE

This invention relates in general to gas pressure gauges such as a portable convenience tire pressure check gauge, and more particularly, to a universal adapter for pressure check gauge refrigerant system pressure checking.

Heretofore, special and expensive tools and equipment have been needed to check the refrigerant level pressure in car air conditioning systems and other air conditioning systems. Use of such equipment can be awkward and demanding, requiring skill, experience and more knowledge than most people have on the subject. Any improvement in checking the refrigerant level in air conditioners and indication of when and how much refrigerant material to add is most welcome. This improvement is a pressure gauge like a tire pressure gauge equipped with an adapter in the form of an instrument of semi rigid yet flexible plastic. The adapter has a bottom tube that is received in the valve head opening of the pressure gauge and about a valve pin within the gauge valve head opening and has a top end opening shaped to fit on and over the low pressure suction side valve fitting on an air conditioning system. The rectangular indicator stem of the gauge has pressure zone indications: add low, safe, high and danger that are color coded as well, however, some sides of the gauge indicator stem are pressure numbered so the check gauge may be used as a tire gauge when the adapter is removed.

It is therefore a principal object of this invention to provide for easy quick safe pressure checking of air conditioner refrigerant systems with an easy to use, easy to read pressure checking gauge.

Another object is to provide an adapter mountable on a gas pressure gauge like a tire air pressure checking gauge making it easy and safe to connect the gauge to a refrigeration system suction side valve fitting and open the valve by pressing the gauge and adapter on the fitting.

A further object is to provide such a refrigerant gas pressure gauge with a fitting adapter that minimizes loss of refrigerant gas while pressure checking of the gauge.

Still another further object is to eliminate any need for expensive, complicated and hard to use refrigerant material hose and dial gauge equipment for pressure checking.

Another object is to provide such a refrigerant material pressure gauge easily convertable to use as a tire pressure gauge merely by removing the adapter from the gauge valve head.

Features of the invention useful in accomplishing the above objects include in an air conditioner system gas pressure gauge, a gas pressure check gauge with a rectangular gauge indicator stem having at least one side indicating pressure zones: add low, safe, high, and danger that are color coded as well. Other sides of the indicator stem are pressure numbered for use of the gauge as a tire air pressure gauge when a fitting adapter is not mounted in place in the valve head of the gauge. The adapter otherwise mounted place in the gauge valve head for use of the gauge as a universal refrigerant system check gauge is an instrument of semi rigid yet flexible plastic having a bottom tube that is received in a valve head opening of a pressure gauge and about a valve pin within the valve head opening. The top end of the adapter has an opening shaped to fit on and over the low pressure suction side valve fitting of a refrigeration system. Internal projections within the bottom internal tube engage the end of the gauge valve pin and a center projection within the adapter top end opening engages the valve stem of the refrigeration system suction side valve fitting so that as the check gauge is pushed toward the refrigeration valve fitting the refrigeration system valve is opened and refrigeration gases propelled from the refrigeration system enter the check gauge passing through the center opening of a resiliently compressible washer and through a port opening in the valve head. The end of the bottom tube compresses the resiliently compressible washer as the valve pin is brought into engagement with the end of the internal projections thereby sealing the adapter to the check gauge and the adapter top end opening so fits the refrigeration system valve fitting that refrigerant materials leak very little if at all.

A specific embodiment representing what is presently regraded as the best mode of carrying out the invention is illustrated in the accompanying drawing.

In the drawing:

FIG. 1A represents a perspective view of a pressure gauge with a rectangular indicator stem having pressure zone indications: add low, safe, high and danger that are color coded as well, and with a semi rigid yet flexible plastic adapter mounted in the opening of the valve head of the pressure gauge;

FIG. 1B, a partial view of the pressure gauge with the rectangular indicator stem in the retracted state;

FIG. 2, a sectioned view of the adapter taken along line 2—2 of FIG. 1 mounted partially insterted in the opening of the valve head of the pressure gauge;

FIG. 3, an end view of the adapter taken from the pressure gauge valve head mounting end; and FIG. 4, a sectioned view of the adapter taken along line 4—4 of FIG. 3 and rotated ninety degrees from the view of FIG. 2 with the adapter fully inserted in the pressure gauge valve head opening and positioned on the suction side fitting of an air conditioner in place compressed togther with the valve stem of the air conditioner pressed so that the valve is open for gas pressure of the refrigerant material to give a gauge indicator stem setting indicative of the charged state of the air conditioning system being checked.

Referring to the drawing:

The universal air conditioner refrigerant pressure gauge 10 as shown in FIGS. 1A, 2 and 4 is shown to mount adapter 11 with bottom tube 12 thereof received in gauge valve head opening 13. The refrigerant pressure check gauge 10 includes a resiliently compressible washer 14 in the valve head opening 13 with a center opening 14A that does not close on valve pin 15 in order that refrigerant gas may pass on through into valve head opening extension 13A. With gas or air pressure passed through opening extension 13A the rectangular gauge indicator stem 16 is driven from the fully retracted state of FIG. 1B to an intermediate extended state or fully extended state of FIG. 1A dependent on the gas or air pressure being gauge 10 measured. The adapter 11 has a bottom tube 12 with an inner slightly tapered opening 17 that receives the end of valve pin 15 that is inserted therein to the extent limited by end contact thereof with tops 18 of hole inner shoulder projections 19, refer also to FIG. 3. These projections 19 extend upwardly to blend into and provide support for a generally rectangular center projection 20 within the bottom portion 21 of adapter top end opening 22 that has a slightly tapered portion 23 like a truncated cone that receives the threaded portion 24 of an air conditioning system suction side valve fitting 25 with the fitting valve cap removed that should otherwise be in place on the fitting 25 to prevent valve leakage. The center projection 20 is so positioned and short enough to effectively contact and push the valve stem 26 of the valve 27 (that may be a Schrader valve) into the interior opening 28 of the fitting 25 to open the valve 27. This is accomplished simultaneously with resilient compression of washer 14 until valve pin 15 contacts the tops 18 of shoulder projections 19 as the refrigerant pressure check gauge 10 is pushed toward the refrigeration valve fitting 25 after the threaded portion 24 thereof has been received in adapter top end opening 22.

Refrigerant material gas then passes from the refrigeration system of the air conditioner through the open valve 27 in the fitting 25 on through openings 30 on opposite sides of rectangular center projection 20 from top end opening 22 and through adapter 10 opening portion 29 of opening 17 coextensive with the lengths of projections 19. The refrigerant material gas then passes from gauge valve head opening 13 through opening extension 13A to pressure drive the rectangular gauge indicator stem 16 for pressure gauge setting. Then as the gauge 10 is manually moved back with the indicator stem 16 pressure set the fitting 25 spring loaded valve 27 simultaneously closes.

It should be noted that the refrigerant gas pressure gauge adapter 11 is molded of plastic that while relatively stiff is flexible enough for the truncated cone portion 23 of opening 22 to make an effective sealing engagement with the threaded portion 24 of the air conditioner suction side valve fitting 25 against refrigerant material leakage while system pressure testing is under way. At the bottom end of the adapter 11 the resilient pressure of washer 14 on the bottom end of tube 12 provides an effective seal from leakage at that end. These adapters 11 are inexpensive enough that they may be provided mounted in valve head openings 13 of pressure gauges 10 that with the adapters 11 removed may be used as tire air pressure gauges.

Referring again to the air conditioner refrigerant gas pressure check gauge 10, in FIGS. 1A and 1B, the valve head 31 containing opening 13 has gauge cylinder housing 32 extended therefrom that contains rectangular gauge indicator stem 16. In addition to pressure numbering at least one side 33 includes pressure zones: add low 34, safe 35, high 36, and danger 37 that are color coded, respectively blue, green, yellow and red as well. Other sides of the indicator stem 16 such as side 38 are pressure numbered for use of the check gauge as a tire gauge when the adapter 11 is not in place inserted in gauge valve head opening 13. Further, a convenient deflater or bleeder tip is provided on the top (or back) of the valve head 31 for bleeding gas from an air conditioner or for deflating a tire.

The universal air conditioner refrigerant gas pressure gauge 10 is useable for all automotive air conditioner units without sight glasses in units generally having rotary compressors. It should be noted that all automotive units with sight gauges and/or piston compressors, the equilavent pressure ranges are approximately ten punds lower on the low pressure suction side valve fitting. The gauge 10 accurately indicates the refrigerant charge level in your air conditioner and when, and generally how much, refrigerant should be added when needed.

Whereas this invention has been described particularly with respect to a single embodiment thereof, it should be realized that various changes may be made without departure from the essential contributions to the art made by the teachings hereof.

I claim:

1. A refrigerant system pressure check gauge adapter comprising: an adapter mold formed of semi rigid yet resiliently flexible plastic having a bottom tube receivable in the valve head opening of a pressure gauge; internal shoulder means within said bottom tube limiting the extent of insertion of a gauge valve pin into said bottom tube; an opening in the top portion of the adapter shaped to fit on and over the low pressure suction side valve fitting of a refrigerant system; projection means within the adapter top portion opening positioned to engage the valve stem of the refrigeration system suction side valve fitting so that as the pressure gauge is pushed toward the refrigerant valve fitting received in said adapter top portion opening the refrigeration system valve is opened and refrigeration material gases pass from the refrigeration system through internal opening passages through the adapter to the pressure gauge to provide a refrigerant gas charge pressure reading for the refrigerant system.

2. The refrigerant system pressure check gauge adapter of claim 1, wherein said internal shoulder means are end surfaces of internal projections within the bottom tube.

3. The refrigerant system pressure check gauge adapter of claim 2, wherein said plastic adapter is formed with a mid body portion with opening means interconnecting the opening of said bottom tube and said opening in the top portion of the adapter.

4. The refrigerant system pressure check gauge adapter of claim 3, wherein said internal projections within the bottom tubes are aligned opposite side internal projections extending from said end surfaces to said projection means within the adapter top portion opening and providing mounting support for said projection means.

5. The refrigerant system pressure check gauge adapter of claim 4, wherein said projection means is generally rectangular in shape mounted in alignment with and spanning the end of the opening of said bottom tube; and with said rectangular projection means short enough from end to end to partially pass into the end opening of a refrigeration system suction side valve fitting as it is depressing a valve stem of the valve fitting.

6. The refrigerant system pressure check gauge adapter of claim 5, wherein said opening means in said mid body portion includes opening extension in said bottom tube of the tube opening along the lengths of said aligned opposite side internal projections, and opening on opposite sides of said rectangular projection means in open fluid communication with said opening in the top portion of the adapter.

7. The refrigerant system pressure check gauge adapter of claim 6, wherein said opening in the top portion of the adapter includes a truncated cone portion with a slightly tapered wall that receives the threaded portion of an air conditioning system suction side valve fitting.

8. The refrigerant system pressure check gauge adapter of claim 7, wherein said opening in the top portion of the adapter also includes an interior opening portion extending deeper into the adapter from said truncated cone portion of said mid body portion of the adapter to receive a nose portion of the air conditioning system suction side valve fitting.

9. The refrigerant system pressure check gauge adapter of claim 3, wherein the external end of said bottom tube moves into sealing engagement with a resiliently compressible washer contained in the valve head opening of said check gauge.

10. The refrigerant system pressure check gauge adapter of claim 9, wherein said resiliently compressible washer is resiliently compressible through a range of movement of said external end of said bottom tube from initial contact until said gauge valve pin engages said internal shoulder means within the bottom tube.

11. The refrigerant system pressure check gauge adapter of claim 10, wherein said check gauge includes a cylinder housing containing a gauge valve stem subject to being driven outward from a retracted state to various degrees of distance up to a fully extended state dependent on the gas pressure being measured by the check valve; and wherein said gauge valve stem has pressure graduation markings on at least one side.

12. The refrigerant system pressure check gauge adapter of claim 11, wherein said gauge valve stem is provided with pressure zone markings for checking refrigerant charge of air conditioners including pressure zone markings: add low, safe, high, and danger.

13. The refrigerant system pressure check gauge adapter of claim 12, wherein said gauge is also useful as a tire air pressure gauge when said adapter is removed from said valve head opening.

* * * * *